UNITED STATES PATENT OFFICE.

EUGÉNE PORION AND LOUIS MÉHAY, OF WARDRECQUES, FRANCE.

METHOD OF UTILIZING THE RESIDUA OF THE ACID TREATMENT OF GRAIN AND OTHER MATERIALS FOR THE MANUFACTURE OF ALCOHOL.

SPECIFICATION forming part of Letters Patent No. 246,816, dated September 6, 1881.

Application filed August 16, 1880. (No specimens.) Patented in France March 27, 1880, and in Belgium July 2, 1880.

*To all whom it may concern:*

Be it known that we, EUGÉNE PORION and LOUIS MÉHAY, both of Wardrecques, in the Department of Pas de Calais, in the Republic of France, have invented an Improvement in Methods of Utilizing the Residua of the Acid Treatment of Grain and other Materials for the Manufacture of Alcohol, of which the following is a specification.

The object of this improvement in the manufacture of alcohol is the industrial utilization of the residua proceeding from the treatment by acids of the amylaceous materials used for the said manufacture—that is, all kinds of grain and amylaceous fruits, such as rice, barley, rye, oats, or other cereals, horse-beans and others, or other leguminous plants, chestnuts, acorns, almonds, pipins, &c.

For the purpose of rendering the residua from the acid treatment, particularly by hydrochloric acid, of grain or other analogous substances suitable for feeding cattle, the saturation of the hydrochloric acid generally used for this purpose (by carbonate of soda) has been recommended, but it was found that the grains obtained did not give all the desirable qualities, above all from the reason that the commercial hydrochloric acid usually contains a large proportion of sulphuric acid, and that the saturation was effected by means of the unrefined carbonate of soda, containing a very noticeable proportion of sulphate of soda, which rendered the malt grains powerfully laxative. To remedy this inconvenience we make exclusive use of perfectly pure carbonate of soda, and we refine the commercial hydrochloric acid by means of a solution of chloride of barium obtained in attacking the native carbonate of barium, either ground or in bulk, by weak hydrochloric acid of about 6° to 8° Baumé. For this treatment we use two vats of equal capacity, each having a small distance above the bottom a cock to draw off the clear liquid, and at the lowest part a stopper for running off the deposit. These vats will be hereinafter called "No. 1" and "No. 2." To proceed with the refining we fill vat No. 1 about half-full of water and add thereto a nearly equal volume of acid to be refined, and afterward a sufficient quantity of the solution of chloride of barium, so the liquid under treatment shall give only a very weak precipitate by a new addition of the reagent. The clear liquid is then allowed, after having settled, to be used for saccharification. When the vat is empty up to the level of the cock it is refilled with water and the precipitated sulphate of barium is put in suspension to wash it and afterward allowed to settle, and during this time the refining operation is put under way in vat No. 2, as stated for vat No. 1. The precipitated material may finally, if considered advisable, undergo several washings of the precipitate by the same means. The waters drawn off from these washings are employed in saccharification like the first waters, and the sulphate of barytes obtained may be sold either as a paint or for the preparation of various chemicals. The so-called refined commercial hydrochloric acid—that is to say, that which has been collected from the vessels in which the ultimate condensation is performed—is equally serviceable; but it will usually be safer and more economical to refine it one's self.

To augment the density of the grains obtained by the acid treatment we preferably put very dense malts in fermentation in such a way as to produce wines yielding from five to six per cent. of alcohol, which may be done without inconvenience by allowing the malt to have a degree of acidity equivalent to about one or two grams of sulphuric acid per quart. In this case it is, moreover, necessary to arrange energetic means of cooling, for the reason that a large proportion of cold water cannot at such time be added for refrigerating, for if the cooling operation should last too long the liquids might turn, more or less, under acid fermentation. The small quantity of free acid remaining in the malt grains is not hurtful to cattle. However, the saturation may be completed by a little carbonate of soda before feeding it to animals.

When the liquid residua cannot be utilized for cattle-fodder it is cheaper to perform the saturation with chalk, as ordinarily done, and the refining of the hydrochloric acid may then be dispensed with; but in this case it will always be preferable to utilize the solid residua of the washes for feeding cattle. To obtain this result it is necessary, first, to separate the sand resulting principally from the chalk used in the operation from the wash, or to avoid its introduction into the work; second, to separate the organic matters in suspension from the liquids; and, third, to free these solid matters from the chloride of calcium resulting from the saturation of hydrochloric acid by chalk.

The first condition (elimination of the sand) is complied with by causing the wines to settle and deposit either in tubs or upon inclined tables, or even by suitably refining by any well-known means the milk of lime employed, and at the same time causing the grain used to undergo a thorough washing.

The second condition (separation of the organic matters in suspension) may be complied with by filtrations of the wash in filtering-presses, and the liquid residua of the operation are then employed in irrigation after cooling them down to a temperature below 40° in reservoirs wherein lime may be advantageously added to neutralize the clear liquor of the wash. A fertilizer very rich in phosphates of lime may then be collected by deposit. This saturation may also be performed with lime upon cloudy and thickened liquids, before passing them through the filtering-presses, in such a way as to retain the phosphates of lime precipitated in the residuary mass. The liquid residua may again be evaporated and treated with lime to form solid fertilizers.

Finally, to comply with the third condition stated, (elimination of the chloride of calcium,) it suffices to again press the material coming from the filter-presses under screw-presses, or, better yet, under hydraulic presses. We thus form cakes of malt grains which, after drying in ovens, may be used either as fodder or as fertilizers. The extraction of the chloride of lime may again be carried on by means of washings, by diluting the materials coming from the filter-presses with water, and again running them through the same apparatus, or through other presses or filter-presses arranged for that purpose. The chloride of calcium being thus eliminated, the cakes obtained are dried either in the open air or in ovens by means of hot air.

When the raw material used for distilling is corn or other oil-containing grain advantage is gained by extracting the oil contained in the cakes produced as above mentioned. For this purpose they are reduced to flour, either in a dry state by means of vertical mills, or wet by means of starching rasps, and then complete the desiccation by passing the rasped product through driers or heaters, such as are used in oil-works, or into drying apparatus for pulverized materials. The dry material should then contain from ten to twenty per cent. of water. The oleaginous flours thus obtained may then be submitted directly to the action of oil-presses after their repassage through the heater.

The materials, cakes, or spent grains or flour obtained as has been described may be preserved without alteration and sold for raw material to oil-manufacturers. The residuary mass obtained after the extraction of the oil also preserves very well, and may be sold either for fodder or fertilizers. When the grains used are rich in oil the wash coming from the moist cakes at the second pressing carries with it a small quantity of oil, which may be easily saved by means of an intermediate reservoir, performing the work of an analyzer—that is to say, furnished with a discharge-pipe in form of a siphon, from which the oil accumulating therein may be removed by means of a small decanting-cock.

The possibility of the above-mentioned extraction is in consequence of a principle which we have been the first to observe: that in the numerous operations of alcohol manufacture—saccharification, fermentation, distillation—the oil contained in the grain remains constantly fixed to the solid undissolved portions in such a way that after the disappearance of the starch these solid matters often contain ten times as much as the grain used.

We may yet, again, cause the separation of the solid materials and the extraction of the oil which they contain immediately after the saccharification of the grain, which will be most advantageous when it is proposed to produce yeast by the clear malt method. In this case we may, as is already known, produce the saccharification upon whole or slightly-broken grain, and by washing extract the clear malts to be put in fermentation. The solid matters being sufficiently drained off by water, they are pressed and worked like the solid residua resulting from wash. The liquors saved during the operation are passed into a lixiviating apparatus. This system may be equally applied to amylaceous fruits, such as the horse-chestnut, the substance of which allows the extraction of an oil much used and a caked residua of good quality for cattle. In this case the fruit should be slightly broken between cylinders before being operated upon.

It is therefore seen that the principal character of the improvements described is that of allowing the economical obtainment of materials proper for feeding to cattle and resulting from the residua of the manufacture of alcohol from grain by acids. Our process may also, at all times, be advantageously applied to the residua of the operation of malting grain.

For operating upon maize or corn and other oleaginous grains it will at such time, in operating as above described, permit us to proceed with the process of extracting the oil remaining in the residua, which latter products will be sensibly improved.

What we claim as our invention, and desire to secure by Letters Patent, is—

The within-described method of utilizing the solid residual matter resulting from the acid treatment of grain and other substances for distillation, consisting in subjecting said residua to pressure in filter-presses and obtaining therefrom both oil and oil-cake.

PORION.
MÉHAY.

Witnesses:
BUILLIEUT,
LE MERCIER.